June 2, 1959

J. K. THOMPSON 2,889,146

DISPENSERS FOR ADHESIVE TAPE OR THE LIKE

Filed May 17, 1956

2 Sheets-Sheet 1

John K. Thompson
INVENTOR.

BY C. A. Snow & Co.
ATTORNEYS.

June 2, 1959 J. K. THOMPSON 2,889,146
DISPENSERS FOR ADHESIVE TAPE OR THE LIKE
Filed May 17, 1956
2 Sheets-Sheet 2
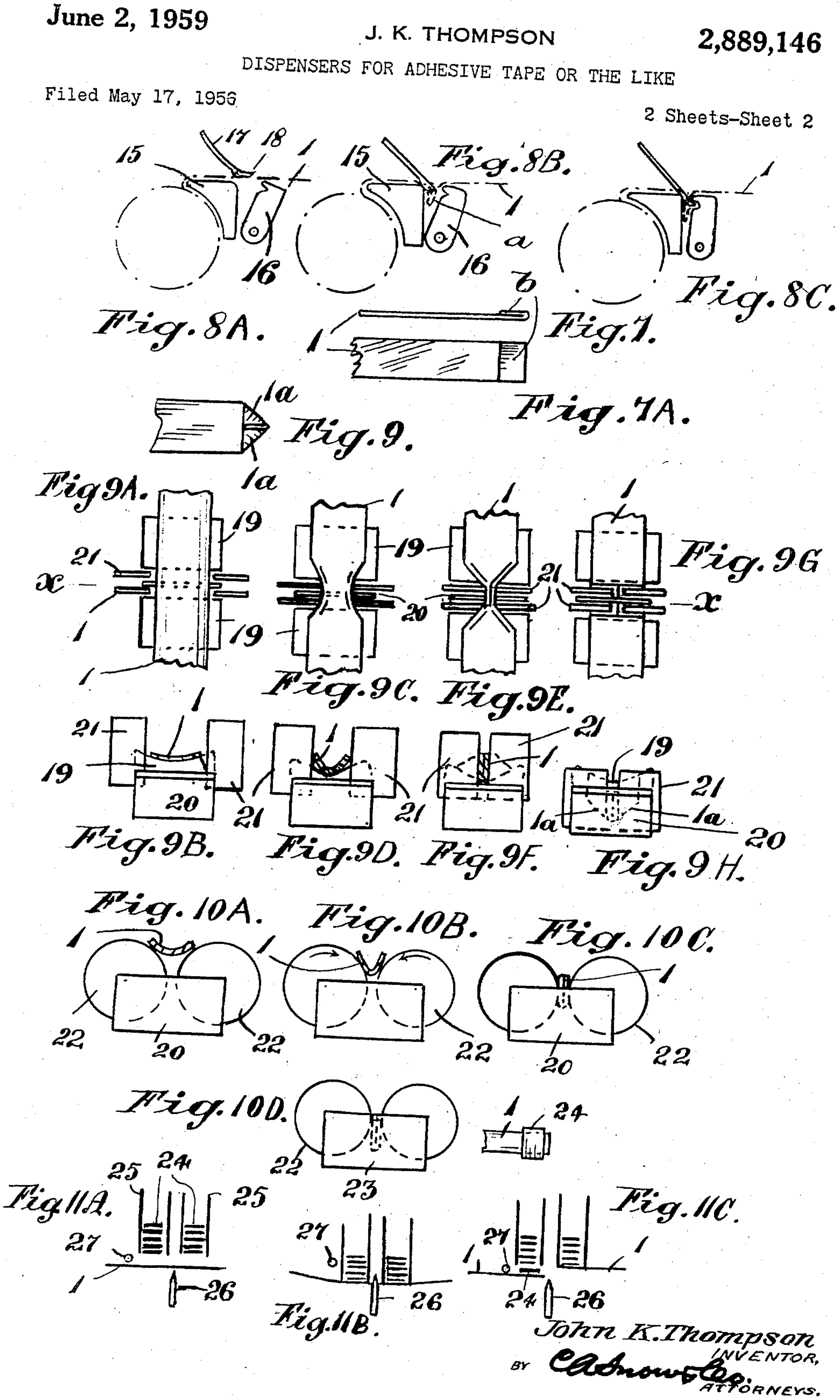
Fig. 7, Fig. 7A, Fig. 8A, Fig. 8B, Fig. 8C, Fig. 9, Fig. 9A, Fig. 9B, Fig. 9C, Fig. 9D, Fig. 9E, Fig. 9F, Fig. 9G, Fig. 9H, Fig. 10A, Fig. 10B, Fig. 10C, Fig. 10D, Fig. 11A, Fig. 11B, Fig. 11C
John K. Thompson
INVENTOR,
BY C.A.Snow & Co.
ATTORNEYS.

2,889,146

DISPENSERS FOR ADHESIVE TAPE OR THE LIKE

John Kenneth Thompson, Malton, England

Application May 17, 1956, Serial No. 585,458
Claims priority, application Great Britain May 21, 1955
3 Claims. (Cl. 270—61)

This invention relates to dispensers for self adhesive tape. As the tape has adhesive on one face, the free ends of the tape have the adhesive thereon and are therefore sticky which is unpleasant and hampers the manipulation of the tape. Moreover, if the tape overlaps and sticks on itself, the end is difficult to release. This invention has for its object to provide an adhesive free tab on a cut end or ends which can be gripped by the fingers. The tab will also enable the tape to be readily removed from articles secured by the tape.

Referring to the drawings:

Figure 1 shows a cut end of a tape with a tab end.

Figures 1A, 1B, 1C and 1D illustrate diagrammatically the process of forming the tab end shown by Figure 1; Figure 1A shows the tape before being cut, the first half of a cut being shown by dotted lines; Figure 1B shows the first half of the cut with the triangular portion 3 partially folded during the cut; Figure 1C shows the second half of the cut with the triangular portion 3 folded over on the body of the tape and Figure 1D shows the cut ends of the tape separated.

Figures 2A, 2B, 2C and 2D illustrate diagrammatically the action of the cutting knife, Figure 2A showing the knife and tape before the cut, Figures 2B and 2C intermediate positions of the cut and Figure 2D, the finish of the cut.

Figure 3 illustrates the initial position of the knife and the platforms over which the tape is drawn and supported during the cut.

Figure 4 is a side elevation of a tape dispenser with a cutting and tab forming appliance combined therewith and showing the knife at the finish of the cut.

Figure 5 is a plan of Figure 4.

Figure 6 is a section on line VI—VI of Figure 5, and Figure 6B illustrates a detail hereinafter referred to .

Figures 1, 1A, 1B, 1C, 1D, 2A, 2B, 2C, 2D, 3, 4, 5, 6, 6B:
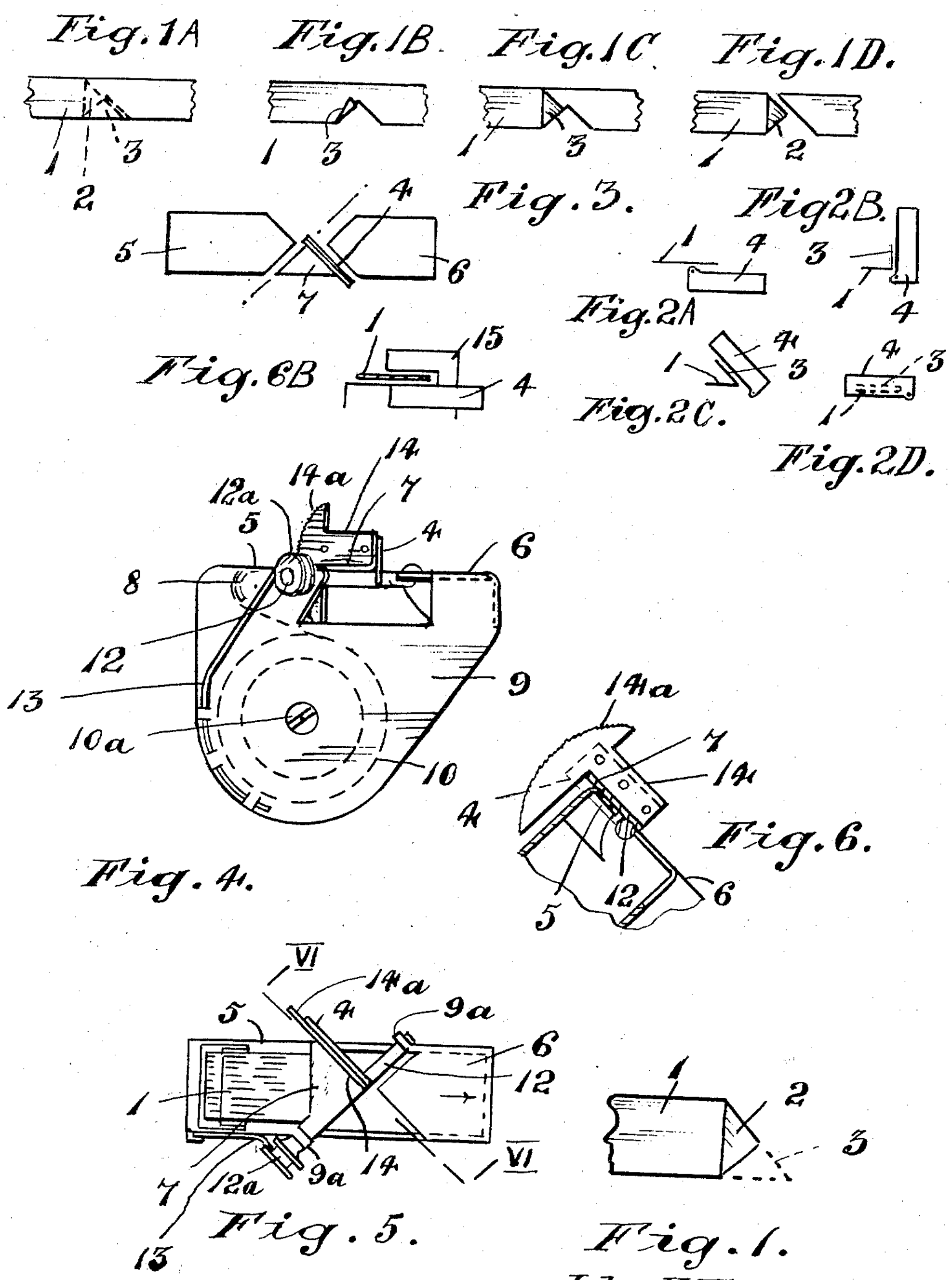

According to one form of the invention, the tape 1 is cut across diagonally at 45 degrees and turned over to form a tab 2. By folding the triangular end 3, with the corners superposed, the triangular tab has the point in the centre line of the tape. A knife 4 is arranged to swing on a pivot axis diagonally across the tape, the pivoted end of the cutting edge of the knife being as near the longitudinal centre line of the tape as practicable. The knife 4 is arranged between two frame platforms 5 and 6 over the top surface of which the tape is drawn from a magazine roll. The knife 4 is normally below the tape (Figure 2A), the adhesive side being the upper side of the tape. To cut and fold the tape the knife is turned through an angle of 180 degrees or more, and on the up stroke of the knife (Figure 2B), the tape is cut halfway across and the loose end 3 is carried up and over with the knife, the tape bending naturally about a line adjacent to and parallel with the centre line of the pivot (Figure 1B). On the down stroke of the knife (Figure 2C) the end 3 is carried right over and adheres to the uncut side of the tape at the same time as the cut is completed (Figure 2D and Figure 1D). The knife may be plain or serrated. The folding and final pressing together of the fold may be assisted by the attachment to the knife of a small pressure plate 7 which projects from the knife and bears on the folded portion 3 following the cut. This plate 7 carries the free end of tape over the fold should it slide off the knife and, at the conclusion of the fold, presses it against the platform 5 of the fixed body of the dispenser. Figures 1A, 1B, 1C and 1D show diagrammatically the cutting and folding of the tape and Figures 2A, 2B, 2C and 2D the movement of the knife 4. The normal tension on the tape is sufficient to hold it against the cut. As described the end of the tape left on the roll is folded and the offcut is cut diagonally but not folded. This can, of course, be reversed, by positioning the parts in the reverse angular direction. If two knives are used both swinging from opposite sides and hands of the blade both ends may be folded although it is necessary to position the knives carefully to leave a small central portion to be severed on the down stroke of the knife. This pad or folding platform 7, when pressing the tape against a fixed platform, may be used as a gripper to draw more tape from the roll by providing relative movement between these members and the roll. This is of particular value when the mechanism is embodied in automatic and semi-automatic machinery.

One embodiment of the aforementioned construction, as illustrated in Figures 4, 5 and 6, comprises a casing 9 which is loaded with a roll of tape 10 on a spool, secured by screw **10*a*. Apart from cutaway portions, the top of the body is flat and forms platforms 5 and 6. The knife spindle 12 is rotatably mounted on lugs 9*a* on the casing 9 in such a manner that the top of the shaft 12 is level with platforms 5 and 6, and the axis of the shaft in the horizontal plane is at 45 degrees across the path of the tape. The pressure plate 7 is attached to the shaft so that, when the tape has been cut, it presses the folded part 3 flat against the tape on the fixed platform 5, and a spring 13 presses on a flat on a head 12*a* on the spindle 12 to hold the pressure plate in this position. An extension 14 on the pressure plate 7 is shaped to form a thumb piece 14*a* for operating the knife and also means for mounting the knife on the spindle. The thumb piece 14*a* also forms a stop contacting the casing 9 to limit the return movement of the knife 4, in which position it is held by the spring 13 engaging a second flat on the head 12*a*. The blade 4, when in this latter position, has its cutting edge protruding above the pressure plate 7, but slightly below the level of platforms 5 and 6. The position of the slot in the casing through which the tape passes from the casing and a curved plate 8, over which the tape is guided to pass the slot in the casing relative to the roll of tape is such that, when threaded through the slot a protruding piece of tape tends to assume a more or less vertical position, unless held against platform 5 either manually or by means of pressure plate 7**. In this position the tape is particularly easy to grasp. When not in use, the dispenser is left with the tape held between the pad and the frame, so that there is no possibility of the tape sticking to the surrounding objects or becoming dislodged.

Where a sharp blade is impracticable, it may be necessary to support the tape against the cut of the blade. This may be done as shown by Figure 6B by disposing a member 15 across that half of the tape affected by the upstroke of the blade. On the downstroke the tape is supported by the aforementioned platforms or by a similar member beneath the tape. To facilitate threading the tape beneath the top member 15, this member may be removable or retractable, the movement preferably operated by the same mechanism as the blade. This top member and the platform 5 beneath the tape may be used in conjunction with the blade to give a scissors action. With a sharp blade, however, the tension of the tape is normally sufficient to hold it against the cut. The action of the blade may be improved by giving it a quick flick over by means of a spring mechanism or the like.

The dispenser may be a simple magazine or a holder for a roll of tape, or it may be a machine or appliance to which adhesive tape is fed from a magazine or roll. The mechanism may be incorporated in: (*a*) a simple hand dispenser, operated by a trigger, plunger or the like; (*b*) a bench type dispenser operated by a pivoted platform or in any other desired manner. The pivoted platform has the advantage that one hand only is used to draw and cut the tape and also that a package may be placed upon the platform to contact the tape, drawn along the platform, drawing the tape with it, and then pressed down to cut the tape; (*c*) the mechanism may be incorporated in various packaging machines or the like where final closure may be effected by means of tape. A fixed knife of the orthodox type may be fitted to the dispensers in addition to the existing mechanism.

Having thus described the invention, what is claimed as new and desired to be secured by Letters Patent, is:

1. For use with a dispenser for tape having adhesive on one side from which a length of tape is adapted to be withdrawn from a magazine source of supply, means for cutting the tape and means for folding the tape for covering over the adhesive side of the tape at an end on the side of the cut by folding over the tape at the said end, comprising a knife mounted on a spindle to pivot about an axis arranged diagonally in relation to the tape withdrawn from the magazine with the knife at right angles to such axis so that one half of the tape is diagonally cut from an edge of the tape to the centre through one face of the tape and from the centre to the other edge of the tape through the other face of the tape, the triangular portion formed by the first half cut being folded over on to adhesive face of the tape by the knife during the rotary cutting action to form a triangular tab or finger grip.

2. For use with a dispenser for tape having adhesive on one side from which a length of tape is adapted to be withdrawn from a magazine source of supply, means for cutting the tape and means for folding the tape for covering over the adhesive side of the tape at an end on the side of the cut by folding over the tape at the said end, comprising a knife mounted on a spindle to pivot about an axis arranged diagonally in relation to the tape withdrawn from the magazine with the knife at right angles to such axis, a platform having an opening diametrically thereacross over which the tape travels as it is withdrawn from the magazine, said spindle on which the knife is fixed being mounted below the platform with the knife edge intersecting below the centre line of the tape so that when the knife is rotated through 180 degrees and through said opening in the said platform one half of the tape is diagonally cut from an edge of the tape to the centre through one face of the tape as the knife swings through said opening in the platform and from the centre to the other edge of the tape through the other face of the tape, as the knife swings through said opening, the triangular portion formed by the first half cut being folded over onto the adhesive face of the tape by the knife to form a triangular tab or finger grip.

3. For use with a dispenser for tape having an adhesive on one side from which a length of tape is adapted to be withdrawn from a magazine source of supply, means for cutting the tape and means for folding the tape for covering over the adhesive side of the tape at an end on the side of the cut by folding over the tape at the said end, comprising a knife mounted on a spindle to pivot about an axis arranged diagonally in relation to the tape withdrawn from the magazine with the knife at right angles to such axis, a platform having an opening diagonally thereacross over which the tape travels as it is withdrawn from the magazine, said spindle on which the knife is fixed being mounted below the platform with the knife edge intersecting below the centre line of the tape, so that when the knife is rotated through 180 degrees and through said opening in the said platform one half of the tape is diagonally cut from an edge of the tape to the centre through one face of the tape and from the centre to the other edge of the tape through the other face of the tape, the triangular portion formed by the first half cut being folded over on to adhesive face of the tape by the rotating knife member during the second half cut to form a triangular tab or finger grip and a pressure plate mounted on said spindle to project at right angles to the knife so that the folded over portion of the tape is pressed on the tape.

References Cited in the file of this patent

UNITED STATES PATENTS

| | | |
|---|---|---|
| 1,104,316 | Rosenthal | July 21, 1914 |
| 1,114,082 | Weis | Oct. 20, 1914 |
| 1,262,986 | Rosenthal | Apr. 16, 1918 |
| 1,283,055 | Bignell | Oct. 29, 1918 |
| 1,745,775 | Tarbox | Feb. 4, 1930 |
| 1,746,119 | Koleta | Feb. 4, 1930 |
| 2,031,053 | Massini | Feb. 18, 1936 |
| 2,145,506 | De Mattio | Jan. 31, 1939 |
| 2,146,934 | Burkey | Feb. 14, 1939 |
| 2,244,282 | Bergstein | June 3, 1941 |
| 2,778,420 | Simon | Jan. 22, 1957 |

FOREIGN PATENTS

| | | |
|---|---|---|
| 38,565 | Austria | Mar. 1, 1909 |